Sept. 23, 1947.  J. B. BENNETT ET AL  2,427,831
BEARING UNIT FOR TAIL WHEELS
Filed Nov. 3, 1943

Inventors:
JAMES B. BENNETT AND
JOHN J. McCARTER

By

Attorney

Patented Sept. 23, 1947

2,427,831

UNITED STATES PATENT OFFICE 2,427,831

BEARING UNIT FOR TAIL WHEELS

James B. Bennett, Alhambra, and John J. McCarter, Los Angeles, Calif., assignors, by mesne assignments, to Thermoid Company, a corporation of Delaware Application November 3, 1943, Serial No. 508,792

1 Claim. (Cl. 308—211)

Our invention relates to a replacement bearing unit for rotary members, such as wheels, and relates in particular to a bearing unit having especial utility in aircraft tail wheels.

Tail wheels of aircraft are subjected to severe usage and it is necessary to replace them at frequent intervals. One type of tail wheel now employed on military or naval aircraft, having pneumatic tires, may require replacement after only one or two landings, and another type having solid rubber treads may require replacement after from ten to several hundred landings, depending upon varying conditions. It is an object of the present invention to provide a bearing unit for a wheel of this type which may be assembled and lubricated at the factory and which may be readily installed with its wheel in a simple manner, immediately ready for service without requiring adjustment and with the assurance that maximum service will be maintained or achieved by the bearing greatly in excess of the life of the wheel as determined by the durability of its tread or tire.

Wheels of the type referred to are ordinarily supported between forks of a caster bracket by means of a pin or shaft which serves as an axle on which the wheel revolves. An object of the invention is to provide a bearing unit which may be installed in the hub of a tail wheel at the factory so that the wheel is ready to be installed in the caster bracket by merely placing the wheel and its contained bearing unit between the forks of the caster bracket and then moving the pin or shaft through the shaft openings of the forks and through the opening provided therefor in the wheel and bearing unit.

A further object of the invention is to provide a bearing unit wherein the ends of the assembly are so formed that the wheel and its contained unit may be quickly moved into position between the ends of the fork, with minimum possibility of injury to the bearing unit due to carelessness of the installer.

It is an object of the invention to provide a bearing assembly having roller type bearings capable of resisting both radial and thrust loads, disposed in spaced relation in an opening in the wheel hub, the outer races of these bearings being prevented from movement toward each other by shoulders formed in the hub, and the inner races of the bearings being held in spaced relation by inner spacing means and a pair of outer facing sleeves, so that axial pressure applied as the result of tightening the nut on the end of the axle pin is taken by these spacer elements and disturbance of the adjustment of the bearings is avoided, thereby assuring that the bearings will be at all times in such proper adjustment that maximum service will be obtained therefrom.

A further object of the invention is to provide a bearing unit wherein the inner bearing races, the spacer members, and grease seals at the ends of the hub opening define a grease chamber which may be packed at the factory to provide sufficient lubricant for a period of use considerably greater than the normal life of the wheel, and a further object is to provide in a unit of this type displaceable means which holds the spacer elements in alignment with the shaft opening of the inner bearing races and also seals the ends of the shaft opening of the unit against loss of grease.

The invention concerns the means employed to accomplish the objects of the invention and also resides in the method of procedure employed to facilitate the placement or replacement of a bearing unit between the forks of a support that carries it.

Further objects and advantages of the invention will be brought out in the following part of the specification.

Referring to the drawing which is for illustrative purposes only,

Fig. 1 an edge view of a tail wheel partly sectioned so as to show the bearing unit therein.

Figure 1:
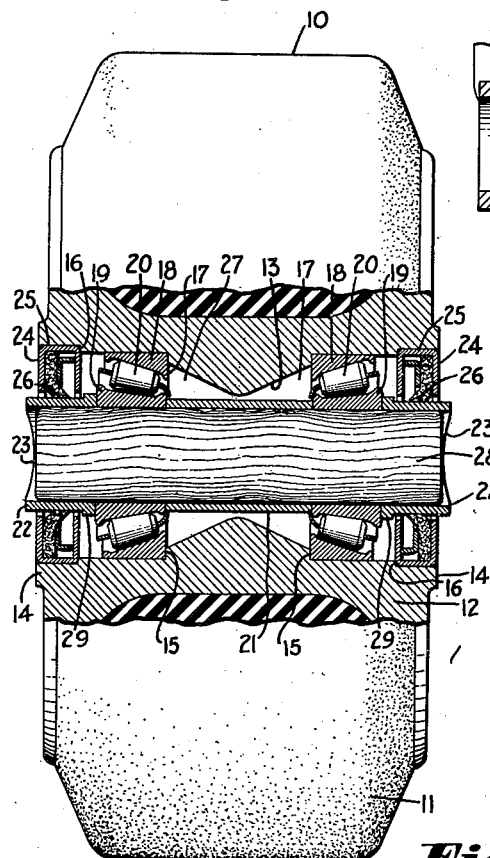

In Fig. 1 we show a tail wheel 10 having a rubber tread 11. The tail wheel 10 has a supporting part 12 which is tubular in its general characteristics and is referred to for purpose of identification as the hub 12 of the wheel. This hub 12 has an axial opening 13 therethrough, and spaced from the outer ends 14 of the hub 12 there are outwardly faced inner shoulders 15. Between the inner shoulders 15 and the ends 14 of the hub there are outwardly faced outer shoulders 16.

Within the hub 12 there is a bearing unit comprising a pair of antifriction bearings 17. Each of the bearings 17 is a tapered roller bearing having an outer race 18 and an inner race 19, with tapered rollers 20 disposed between the inner and outer races, the bearings being disposed so that together they operate to carry both the radial and thrust loads which may be incurred in the rotation of the wheel 10 around its supporting axle.

The outer races 18 engage the inner shoulders 15 and movement of the inner races 19 toward each other is limited by a spacer wall 21 which is referred to as the inner spacing means, and comprises a sleeve having an opening corresponding in diameter to the opening through the inner bearing races 19. Outer spacer walls 22 engage the outer ends of the inner bearing races 19 and project outwardly to positions beyond the ends 14 of the hub 12. These outer spacer walls are short sleeves having openings therethrough corresponding in diameter to the internal diameters of the inner bearing races 19, and the outer end portions of these outer spacer sleeves are chamfered as shown at 23. Within the outer ends of the hub 12 grease seals 24 are placed, these grease seals 24 engaging the outer shoulders 16 and being held in place by frictional engagement of the outer metal parts 25 of the grease seals with the hub wall. The inner portion 26 of each grease seal 24 engages the outer surface of an outer spacer sleeve 22. The spacer sleeves 21 and 22, the inner bearing races 19, and the grease seals 24 define within the opening 13 an annular grease chamber 27. Through the assembly of parts comprising the bearing unit, a splint or filler member 28 is extended; this filler member may be made of some cheap material such as wood and consists in a cylinder or bar, the external surface of which engages the inner surfaces of the members 19, 21 and 22. Accordingly, the member 28 not only holds the sleeves 21 and 22 in alignment with the inner bearing races 19, but also serves as a seal for the ends of the shaft opening defined by the parts 19, 21, and 22. The outer spacer sleeves 22 have external annular shoulders 29 thereon to prevent removal of the sleeves 22 from their positions within the respective grease seals 24.

Figure 3:
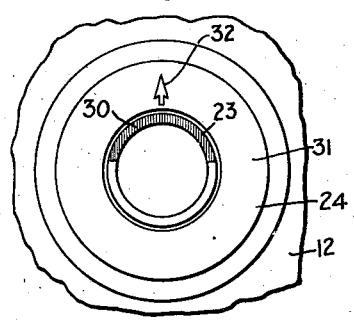
Fig. 3 is a fragmentary face view showing the markings on the bearing unit to indicate the position of the parts as the unit is moved into location between the supporting forks.

At the factory the grease chamber 27 is filled with lubricant and the outer spacer sleeves 22 are oriented so that they both face in the same direction, and suitable markings are applied to the structure to indicate the positions of the chamfers 23. For example, as shown in Fig. 3, a coating 30 of red paint is applied to each chamfer 23, and adjacent the chamfer 23, on the outer surface 31 of the associated grease seal 24, a red arrow 32 is applied to indicate the direction in which the wheel and the bearing unit are to be moved into position between the supports which are to carry the same.

Figure 2:
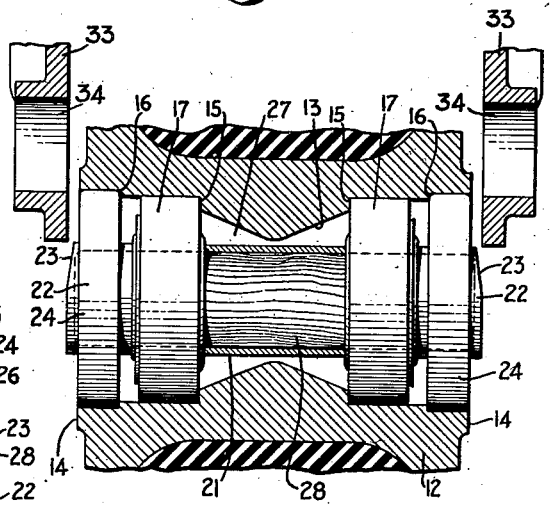
Fig. 2 is a fragmentary sectional view showing the manner in which the wheel and its bearing unit are moved into position between the forks of a supporting bracket.

In Fig. 2 the bearing unit is shown positioned adjacent the ends of forks 33 which form a part of a wheel supporting bracket, these forks having therein shaft openings 34. The operator who is to insert the wheel and bearing unit, refers to the markings 30 and 32 and turns these markings toward the shaft openings 34, so that the chamfers 23, as shown in Fig. 2, will be faced toward the ends of the forks 33, and will be first to engage the ends of the forks 33 as the wheel is moved so as to bring the axis of the bearings 17 into coincidence with the axis of the shaft openings 34 of the forks 33. Should the forks 33 be sprung inward slightly, the chamfers 23 will engage the same and force them apart as the bearing unit is moved into the position thereof shown in Fig. 4.

Figure 4:
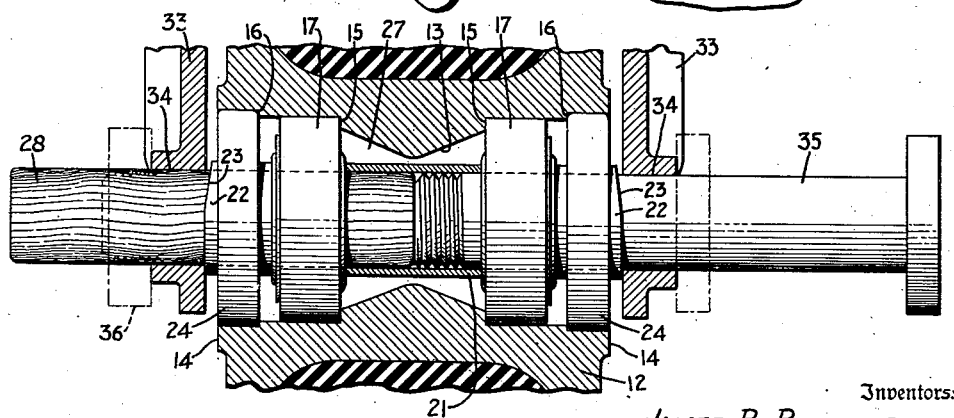
Fig. 4 is a fragmentary sectional view showing the manner in which the pin or shaft displaces the removable filler element of the bearing unit when the pin or shaft is moved axially into operative position in the forks and the bearing unit.

Fig. 4 shows the next step in the assembling operation, wherein the pin or shaft member 35 is moved axially in through one of the fork openings 34 so that by continued movement thereof, the filler 28 will be displaced from its normal position and through the other fork opening 34. When the shaft 35 has been moved entirely through the bearing unit and through both openings 34 of the forks 33, it may be secured in place as by applying a nut to the threaded end of the shaft as indicated by dotted lines 36 of Fig. 4. The tightening of this nut 36 on the shaft 35 will apply inward pressure against the ends of the outer sleeves 22 to hold the assemblage of parts 19, 21 and 22 tightly together in end to end engagement, but the tightening of the nut 36 cannot act to maladjust the bearings 17 for the reason that the inner races thereof are held in properly spaced relation by the spacer wall means 21. Also, the tightening of the nut 36 will clamp the parts 21, 19, and 22 against rotation so that these parts will remain stationary with the shaft 35. The grease seals 24 will then rotate with the hub and the inner portions 26 thereof will slide circularly upon the outer surfaces of the sleeves 22. The ends of the members 21 and 22 which engage the ends of the inner races 19 are accurately machined so that grease will not leak past these ends from the grease chamber 13.

We claim as our invention:

A wheel assembly for mounting between the spaced members of a wheel support comprising a hub having an axial opening therethrough, a pair of anti-friction bearing assemblies having outer races engaging outwardly facing axially spaced shoulders in said hub opening, inner races for each of said bearing assemblies, an inner sleeve disposed between said inner races for maintaining said inner races in axially spaced relation, outer sleeves disposed against the outer ends of said inner races with each sleeve extending beyond the adjacent end of the hub, the outer ends of said outer sleeves being chamfered to facilitate positioning of the wheel assembly between the spaced members of a wheel support, said inner races, inner sleeve, and outer sleeves having axial bores therethrough of uniform diameter, and a cylindrical splint of relatively soft material extending through said axial bores and frictionally engaging the walls thereof to retain said races and sleeves against axial or rotational movement relative to each other.

JAMES B. BENNETT.
JOHN J. McCARTER.

REFERENCES CITED

The following references are of record in the file of this patent:

UNITED STATES PATENTS

| Number | Name | Date |
| --- | --- | --- |
| 2,034,534 | Pitner | Mar. 17, 1938 |
| 2,215,134 | Rehnberg | Sept. 17, 1940 |
| 2,199,089 | Frank | Apr. 30, 1940 |